United States Patent Office 3,537,301
Patented Nov. 3, 1970

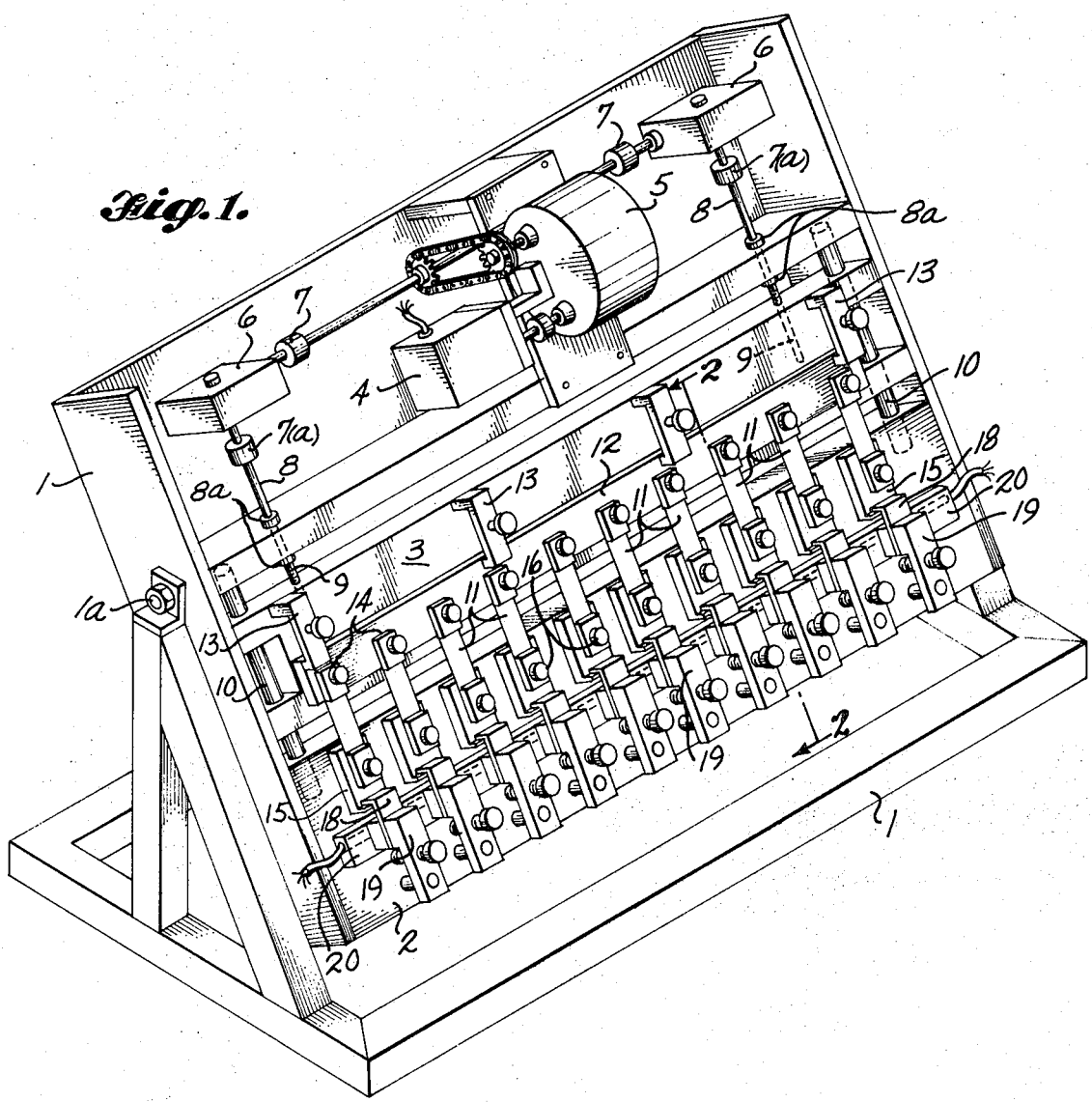

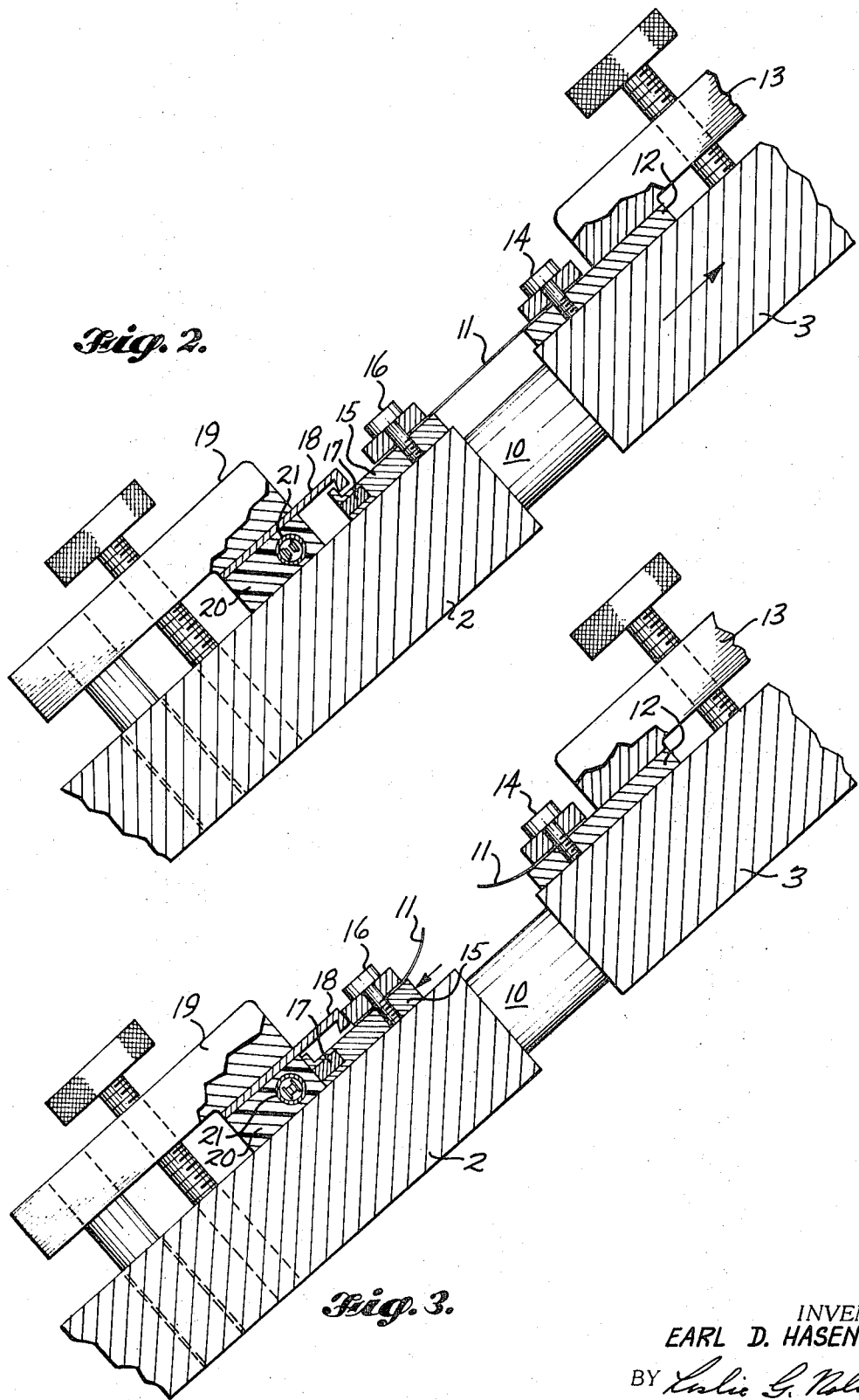

3,537,301
APPARATUS FOR TESTING THIN FILMS, FOILS AND OTHER MATERIALS

Earl D. Hasenwinkle, Longview, Wash., assignor to Weyerhaeuser Company, Tacoma, Wash., a corporation of Washington
Filed July 16, 1968, Ser. No. 745,248
Int. Cl. G01n 3/08
U.S. Cl. 73—95                                 3 Claims

ABSTRACT OF THE DISCLOSURE

An apparatus for determining strength and/or elongation at failure of a plurality of thin films or foils with means for automatically recording the point of failure, the apparatus having a stationary bed and carriage movable with respect thereto, both inclined at a positive angle from the horizontal, the movable carriage being driven to or away from the bed by suitable means. Sample films to be tested are fixed at one end to the movable carriage by clamps or other means and at the other end to movable sample blocks on the stationary bed. The sample blocks are restrained from movement in the direction of the carriage by hooks. Electrical counters, one for each clamping position, are actuated when the carriage is moved. The elongation of the samples is easily determined from the time to failure and the rate of loading of the samples. On tensile failure of each of the thin films the sample block holding it drops by gravity against a contact block stopping the counter.

BACKGROUND OF THE INVENTION

Field of the invention

This invention relates to an apparatus for measuring and testing thin films, foils, and other materials.

Prior art relating to the disclosure

Although many testing machines are available for determining strength and/or elongation of thin films and foils at the point of failure, they normally test only one sample at a time and require the presence of an operator to note readings corresponding to load or extension. Other machines, such as the "Landers Environmental Stress Rupture Tester," available from Thwing-Albert, apply a constant load individually applied up to 20 samples under controlled conditions and measure the time failure of each. This instrument, however, is incapable of determining the elongation of a particular sample at the point of failure.

SUMMARY OF THE INVENTION

This invention relates to a device for subjecting up to 10 or more samples of paint films or other similar thin films or foils simultaneously to tensile stress and is particularly adapted to extremely low strain rates, for example 2%/min. to 0.002%/min., and for automatically timing or measuring the point at which each film fails. The film samples are pretensioned to the same amount to eliminate variables due to wrinkles or bows. The apparatus comprises a supporting frame, a stationary bed mounted on the supporting frame and inclinable at a positive angle with respect to a horizontal plane, a movable carriage mounted on the supporting frame in spaced opposed relation to the stationary bed and in the same plane thereof, a series of clamping means spaced along the carriage member to secure one end of a plurality of thin films, and a second series of clamping means spaced along the stationary member to secure the other ends of the thin films. Each of the clamping means on the stationary bed is directly opposed to and corresponds to a respective clamping means on the movable carriage. The clamping means on the stationary bed includes a plurality of sample blocks to which the ends of the film specimens are secured, the sample blocks being movable and located on the stationary bed. Means are provided to restrain movement of the sample blocks in the direction toward the movable carriage. Drive means are provided to move the movable carriage linearly to or away from the stationary bed so as to elongate the film specimens held by the clamping means on both the stationary bed and movable carriage. On breaking or failure of each of the films signal means are provided which note the time elapsed from initial movement of the movable carriage away from the stationary member to time of failure. The signal means comprises essentially an individual electrical timing circuit for each of the clamping points with means to actuate the timers on initiation of the movement of the carriage away from the stationary bed. On breaking or fracture of the samples the sample block on the stationary bed, being movable, falls by gravity against a contact point, stopping the electrical counter for that particular block. The time elapsed can be converted to percent elongation at failure.

BRIEF DESCRIPTION OF THE DRAWINGS

FIG. 1 is a perspective view of the measuring and testing apparatus of this invention in position for testing films and foils.

FIGS. 2 and 3 are expanded views along section line 2—2 of FIG. 1 showing details of the clamping mechanism.

DETAILED DESCRIPTION OF THE DRAWINGS

Referring now to FIG. 1, the apparatus of this invention comprises a supporting frame 1 on which is mounted stationary bed 2. Directly opposite stationary bed 2 is located movable carriage 3. The entire frame in which bed 2 and carriage 3 are mounted can be rotated to a vertical or near-vertical position around bearing supports 1a. The carriage is moved to and away from stationary bed 2 by a suitable drive means. As shown in FIG. 1 the drive means consists of motor 4, variable speed transmissions 5 and fixed transmissions 6. The variable speed transmissions 5 are coupled to fixed transmissions 6 by means of couplers 7. The fixed transmissions drive screws 8 through couplers 7a. Screws 8 and thrust bearings 8a engage corresponding threads 9 in carriage 3 to move the carriage on rotation of the screws. Referring to a specific drive system, one can be used having typical output speeds ranging from 60 r.p.m. to 0.06 r.p.m. Ways 10 prevent carriage 3 from canting when it is moved to or away from bed 2.

On both stationary bed 2 and movable carriage 3 are located a plurality of clamping stations or clamping points to which the film specimens to be tested are attached. Expanded views of a cross section of one of these clamping points are shown in FIGS. 2 and 3. FIG. 2 shows the position of the clamps prior to fracture or failure of the test sample. FIG. 3 shows the position of the clamps after failure of the test sample. The thin films or foil 11 to be tested are fixed at one end to a sample bar 12 extending at right angles to the length of carriage 3. Sample bar 12 is held in place by clamps 13. The films may be adhesively secured to the sample bar 12 or secured as shown by a series of rubber or urethane coated clamps 14. The free end of samples 11 are then secured to corresponding clamping points on stationary bed 2 directly opposite those on carriage 3. The clamping stations or clamping points on stationary bed 2 consist of a plurality of sample blocks 15 preferably restrained from lateral movement. These blocks are freely movable or slidable in a direction parallel to the movement of carriage 3. The free end of the film samples is adhesively secured to sample blocks 15 or secured by means of coated clamps 16 as shown. The sample blocks are restrained in their movement toward carriage 3 by sample hooks 18 held in place by clamps 19.

Referring now to FIGS. 2 and 3 specifically, contact plates 17 are located in the rear portion of sample blocks 15. A contact block 20 running the entire length of stationary bed 2 is also provided. The function of contact plates 17 in relation to contact block 20 will be explained later.

As shown in FIG. 1 the film samples 11 are affixed to sample bar 12 and sample blocks 15 by coated clamps 14 and 16. This is usually done in a horizontal position for convenience and the tester frame then rotated to in inclined position about bearing supports 1a. The thumb screws which clamp sample hooks 18 to contact bar 20 are then loosened slightly to allow the combined weight of sample hooks 18 and sample blocks 15 to pretension the films being tested. The thumb screws are then retightened and the drive system for the movable carriage 3 actuated. As the carriage 3 is moved away from stationary bed 2 each of the film samples is subjected to elongation. As each film fails upon reaching its maximum elongation sample blocks 15 are free to fall by gravity against contact block 20. When this happens, an electrical counter for that individual film is stopped. The time from initial movement of the carriage away from stationary bed 2 to failure of the film can then be converted to percent elongation at failure.

The electrical counting circuit (not shown) is a conventional one. An electrical counter is provided for each of the films being tested. The counters are preferably actuated by relays, not shown, upon start of the drive means to move carriage 3 away from stationary bed 2 after the samples 11 have been affixed to the sample bar 12 and sample blocks 15 and pretensioned as described previously. The cutoff circuit for the individual counters may comprise hermetically sealed reed switches 21 in the insulated contact block 20 with the contact plates 17 comprising small magnets inserted into slots milled in the hook end of sample blocks 15. As the sample blocks 15 fall toward contact block 20 on failure of the film being tested, the magnets actuate the reed switches which are in the relay circuit without making physical contact. Other types of switching arrangements are suitable such as one in which the sample blocks 15 physically close an electrical circuit by falling across contact points, not shown, mounted on contact block 20.

The electrical circuit may be modified to show direct elongation readings on the counting devices for the various strain rates of, for example, 1%, 0.1%, and 0.01% per min. This is accomplished by operating the counters at a rate corresponding to the time required to move carriage 3 a distance of 0.0001 inch. In other words, at a rate of 1% on a 1-inch sample length, the counters will operate 100 times per min. For 0.1% and 0.01% rates, counting is 10 per min. and 1 per min. respectively.

The percent elongation of the various samples can otherwise be calculated by knowing the rate of loading (rate at which carriage 3 is moved away from stationary bed 2) of the samples and the time elapsed from initiation of movement of carriage 3 to failure of samples.

The apparatus described is simple in operation, reliable, and samples can be tested without the presence of an operator or other personnel. The apparatus is most useful for testing thin paint films for properties of elongation. With this apparatus these determinations can be made easily and without having to closely watch the operation of the test. Timing of the failure of the samples is automatically recorded at the time of failure thus enabling tests which require days to be made without attention from an operation. The apparatus as a unit is usually operation under thermostatically controlled conditions to enable accurate results.

What is claimed is:

1. In a testing machine for measuring elongation at tensile failure of a plurality of samples comprising:
    (a) a supporting frame;
    (b) upper and lower members horizontally mounted on the supporting frame, at least one of the members being movable in relationship to the other in a direction normal to their horizontal axes;
    (c) clamping means mounted in opposing relationship on the upper and lower members and lying in a common plane for retaining the samples being tested, said clamping means comprising
        (1) a plurality of opposed clamping stations on the upper and lower members, the clamping stations being in side by side relationship;
        (2) first clamping means mounted at each of the clamping stations of the upper member for securing the uppermost end of the test samples;
        (3) second clamping means mounted at each clamping station of the lower member, each second clamping means comprising
            a sample block adapted for securing the lowermost end of the sample, the sample blocks being freely movable in a direction parallel to the applied force;
        (4) sensing means responsive when the sample blocks fall to a lower position; and
        (5) timing means to indicate elapsed time from initial application of tensile force by the drive means until sample failure is signalled by the sensing means;
    (d) means coupled to at least one of the members for driving the members apart at a predetermined rate to impose a tensile force which elongates the samples;
the improvement which comprises
    restraining means to hold the sample blocks in an initial position on the lower member while tension is applied to the samples until the time of sample failure whereupon the sample blocks are free to drop by gravity to said lower position.

2. In a testing machine for measuring elongation at tensile failure of a plurality of samples comprising:
    (a) a supporting frame;
    (b) upper and lower members horizontally mounted on the supporting frame, at least one of the members being movable in relationship to the other in a direction normal to their horizontal axes;
    (c) means coupled to at least one of the members for driving the members apart at a predetermined rate to impose a tensile force which elongates the specimens; and
    (d) clamping means mounted in opposing relationship on the upper and lower members and lying in a common plane for retaining the samples being tested; said clamping means comprising
        (1) first clamping means mounted on the upper member for securing the uppermost end of the test specimens;
        (2) second clamping means mounted on the lower member, each second clamping means comprising
            a sample block adapted for securing the lowermost end of the specimen, the sample blocks being freely movable in a direction parallel to the applied force; and (3) sensing means responsive where the sample blocks fall to a lower position;
the improvement comprising
restraining means to hold the sample blocks in an initial position on the lower member while tension is applied to the specimens until the time of sample failure whereupon the sample blocks are free to drop by gravity to a lower position.

3. The machine of claim 2 in which said sample block has an outwardly extending detent, and said restraining means has an inwardly extending detent that cooperates with said block detent to prevent movement of said block toward said movable member.

References Cited

UNITED STATES PATENTS

| 1,499,546 | 7/1924 | Oxley | 73—91 |
| 2,136,344 | 11/1938 | Kochheiser et al. | 73—95 |
| 2,831,343 | 4/1958 | Raring et al. | 73—95 |

RICHARD C. QUEISSER, Primary Examiner

M. SMOLLAR, Assistant Examiner

U.S. Cl. X.R.

73—91, 102, 103, 160